May 22, 1962 J. E. GOLDRING 3,035,268
PNEUMATICALLY-OPERATED FASTENER DRIVING MACHINE
Filed Oct. 5, 1959

INVENTOR.
JOHN E. GOLDRING
BY Gardner & Zimmerman
ATTORNEYS

United States Patent Office 3,035,268
Patented May 22, 1962

3,035,268
PNEUMATICALLY-OPERATED FASTENER DRIVING MACHINE
John E. Goldring, San Leandro, Calif., assignor to Modernair Corporation, San Leandro, Calif., a corporation of California
Filed Oct. 5, 1959, Ser. No. 844,361
8 Claims. (Cl. 1—44.4)

The present invention relates generally to pneumatically operated machines for efficiently driving staples, tacks, beads, or other fasteners through parts to be assembled, and is particularly directed to such a machine having a main body with power assembly and fastener receiver readily removable therefrom to facilitate the driving of various size fasteners with the same machine body.

In recent years pneumatically operated fastening machines or guns have been extensively utilized for the high speed driving of industrial fasteners of the staple, nail, pin, or other types. As it is necessary from time to time to use different size fasteners it is highly desirable that fastening machine be so made as to be readily convertible for use from one size fastener to another. Otherwise, a plurality of machines each for use with a different size fastener would be required.

While various pneumatically operated fastener driving machines have been heretofore devised to be used with different size fasteners, these machines have been relatively complex in their construction and required substantive time and effort to convert to use from one size fastener to another. This is due largely to the nature of pneumatically operated fastener driving machines in general. More specifically such machines commonly include a handle section which carries an air cylinder and piston as well as a fastener magazine. A driving blade is attached to the piston and arranged to drive a fastener from the magazine into the material to be fastened with each power stroke of the piston. The size of the driving blade and stroke length of the piston are necessarily correlated to the size of the fasteners the magazine is arranged to hold. Thus, for a machine to be convertible to use with fasteners of varied sizes, not only must provision be made for interchangeable magazines of the different size fasteners, but also for driving blades of varied sizes and pistons of varied stroke lengths to accommodate the different size fasteners. One expedient which has been devised to facilitate the necessary interchangeability is the provision of magazine units including the corresponding piston and driving blade as a unitary part thereof, the entire unit being interchangeable upon the handle and relative to the air cylinder. Interchangeable magazine units of this type, however, constitute a major portion of the overall fastening machine. Although a plurality of these interchangeable major units may be provided at a lesser cost than a corresponding plurality of separate complete driving machines for each size fastener, the cost of the units is still relatively high. Furthermore, in order to detach one magazine unit from the handle and cylinder and attach another therewith, the unfastening and fastening procedure is relatively complex. The unit necessarily is not only fastened to the handle, but also to the air cylinder. To change units amounts to reassembly of a major portion of the machine.

Further to the above, conventional fastener driving machines of unitary as well as the convertible types, have included cylinders and pistons of circular cross section as a standard item in their construction. Consequently, the position at which the fasteners are driven from the machine is displaced by a substantial distance from the leading edge portion thereof as determined by the outer periphery of the cylinder. It is therefore difficult to drive the fasteners in close proximity to a marginal wall at the edge of a part to be fastened.

In order to overcome the foregoing difficulties of pneumatic fastener driving machines, I have provided an improved driving machine of unique construction which is readily convertible to use with different size staples and wherein the location at which the fasteners are driven from the machine is closer to the front end of same than heretofore possible. More particularly the driving machine of the present invention includes a main body having a fastener magazine integral therewith and wherein only the fastener receiver is removable to facilitate interchangeability of different size fasteners therein. In addition, the main body is arranged to receive a power assembly in the form of a readily removable unit which includes the air cylinder, piston, and driving blade. With the assembly removed, the piston may be readily removed from the cylinder for rapid replacement of the blade secured thereto or for replacement of the piston, to accommodate a variety of different size fasteners. The same basic power assembly and the same basic magazine may hence be used for fasteners of substantially all sizes. The power assembly also features an oval cylinder and piston which facilitates placement of the driving blade extremely close to the front of the machine.

It is therefore a primary object of the present invention to provide a pneumatically-operated fastener driving machine which is readily convertible for use with fasteners of all sizes.

Another object of this invention is the provision of a unitary pneumatic fastener driving power assembly removable from a main body, such assembly including a cylinder, piston, and reservoir wherein both the power and return strokes of the driving piston are pneumatically effected by pressure fluid from the reservoir.

Still another object of the present invention is to provide a fastener driving gun having a removable driver unit which may be removed without disturbing the fastener magazine and feed.

It is yet another object of my invention to provide a fastener driving gun wherein the fastener track or receiver may be removed from the fastener magazine without interference with the power driving unit.

Still another object of the present invention is the provision of a pneumatic fastener driving machine of the class described wherein the tracks in the fastener magazine and driving blade in the removable power unit are interchangeable to accommodate fasteners of many different sizes and types with substantially the same basic machine.

A further object of this invention is to provide a pneumatically operated fastener driving gun of the class described having a main gun body of plastic for accepting the various power elements and fastener receivers.

An even further object of the invention is the provision of an oval piston and cylinder in a pneumatic fastener driving machine which permits placement of the driving blade relatively close to the front of the machine.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
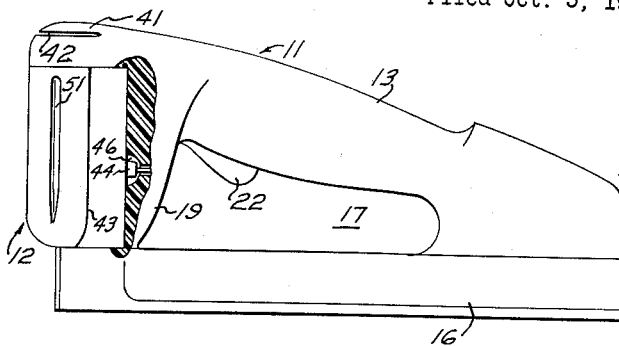
FIGURE 1 is a side elevation view partially in section of a fastener driving machine embodying features of the invention.

The pneumatically-operated fastener driving machine of the present invention, as will be seen from the drawing, comprises generally a main body 11 and a power assembly 12 provided as a removable unit from the body. The body preferably includes a handle portion 13 housing a fluid reservoir 14 and providing with a fastener magazine portion 16 therebelow a convenient hand hole 17. The magazine portion 16 houses a fastener feed mechanism (not shown) of conventional construction and a removable fastener guide 18 to facilitate the ready interchange thereof in order to accommodate fasteners of different sizes. In addition, the body 11 includes a head portion 19 between the handle and magazine portions, such head portion defining the forward end of the hand hole 17. The head portion 19 houses at its upper end a quick release valve 20, preferably of the poppet type, and is recessed as shown generally at 21 or otherwise arrange to receive the removable power assembly 12 for actuation by the valve 20. Control means preferably in the form of a finger operated trigger 22 at the forward end of the handle portion 13 is provided for the responsive operation of the valve 20 and triggering of the power assembly to drive a fastener from the magazine portion 16 into a work piece positioned therebelow. Such arrangement of the main body facilitates the construction of the several portions thereof as a unitary casting of light weight structural material, preferably molded plastic.

The removable power assembly 12 houses a cylinder 23 and air reservoir 24 and includes a piston 26 reciprocally disposed within the cylinder. Communication between the cylinder and reservoir is controlled by the valve 20 when the power assembly is inserted in the head portion 19 of the main body 11. The cylinder, reservoir, valve, and piston are arranged for coaction in accordance with the principles disclosed in U.S. Patent No. 2,872,901 which issued to Goldring et al., February 10, 1959, whereby the power stroke and return stroke of the piston are both pneumatically effected. The power assembly further includes a driving blade 27 removably attached to the end of the piston. The tip of the blade protrudes from the underside of the assembly into engagement with the fasteners in the magazine portion 16 of the main body 11. A removable blade guard 28 is preferably provided at the underside of the power assembly forward of the protruding blade tip to define with the forward end of the magazine portion 16 a guide slot or driveway 29 therebetween for the blade 27.

It is particularly important to note that whenever it is desired to convert the fastener driving machine to use with fasteners of different size, the blade guard 28 is removed and the present fastener receiver 18 is replaced with one to accommodate the size of fasteners that are desired to be used. To complete the conversion, it is merely necessary to remove the power assembly 12 from the body, remove the piston through the open top of the cylinder, replace the driver blade, or in some instances the entire piston, with like components of a proper size to accommodate the different size of the fasteners, insert the piston into the cylinder, reattach the power assembly to the body, and reattach the blade guard 28. Hence, substantially the same basic machine may be readily used with fasteners of all sizes.

It is further particularly important to note that the cylinder 23 and piston 26 are advantageously of oval or elliptical cross section with the minor diameter disposed at right angles to the front face of the power assembly 12. With such configuration, the axis of the piston and consequently the driving blade 27 is located much closer to the front of the machine than they would be in the case of a piston and cylinder of conventional circular cross section of equivalent area. The fastener driving machine of the present invention may hence be employed in much closer proximity to a marginal side wall than machines of previous design.

As regards more particularly the preferred structure of the pneumatically operated fastener driving machine of the present invention, the principles thereof are embodied in the drawing as a stapling gun. The invention, however, is not to be taken as limited to staples, the basic principles thereof being equally as applicable to other types of fasteners.

Considering more particularly the details of the main body 11, it will be noted that the fluid supply reservoir 14 housed within the handle portion 13 extends substantially the length thereof. A hose bushing 30 may hence be provided at the rear end of the handle portion in communication with the reservoir 14 to facilitate attachment of a hose leading to a source of air under pressure. At the forward end of the handle portion there is provided a transversely elongated air passage 31 (see FIG. 2) which extends longitudinally between the reservoir 14 and a location communicably adjacent the top of the recess 21 in the head portion 19 of the body. The air passage 31 facilitates inlet of air to the reservoir 24 of the power assembly 12 when installed within the recess 21, the reservoir 24 being in effect a portion of reservoir 14. Another passage 32 extends from reservoir 14 to an enlarged bore 33 extending into the underside of the handle portion from the hand hole 17 and defining the seat of a control valve 34. A passage 36 extends from the juncture of the valve seat and passage 32 to a recess 37 in the upper end of the head portion 19 for receiving the quick release valve 20. The control valve 34 is secured to the trigger 22 and functions upon depression thereof to block the passage of air from passage 32 to passage 36 and vent the latter passage to a by-pass opening 38 in the valve. When the trigger is depressed, the flow of air from the opening of pasage 36 into the recess 37 housing the quick release valve 20 is hence interrupted. Such interruption of air serves to actuate the valve in a manner subsequently disclosed.

Considering now the detailed structure of the head portion 19, it is preferably formed to include a generally curving semi-elliptical front end face between substantially flat parallel side faces. The recess 21 in the front end face for receiving the power assembly 12, however, is formed as substantially a vertically elongated transverse slot extending from immediately above the magazine portion 16 to a horizontal plane relatively closely vertically spaced from the top of the head portion. The slot extends longitudinally to approximately the intersections of the curved end face with the flat parallel side faces to form vertical edges 39 and the recess extends further longitudinally rearward a substantial distance into the region of the head portion laterally bounded by the side faces. Consequently the top or crown 41 of the head portion is the only portion thereof that retains the semi-elliptical front end face configuration. This crown 41 has the valve recess 37 formed vertically coaxially therein, which recess communicates with the upper region of the recess 21. In addition, a transverse bleeder slot 42 is provided through the front end face of the crown 41 in communication with the upper region of the valve recess 37.

Figure 4:
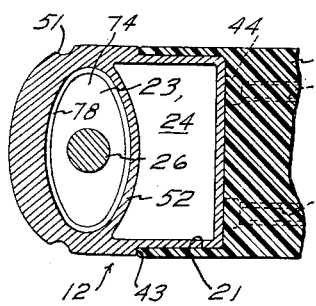
FIGURE 4 is a sectional view taken on the line 4—4 of FIGURE 2.

It will be appreciated that in order for the removable power assembly 12 to be operatively coactive with the valve 20, magazine portion 16 and other elements of the main body 11, provision must be made for the proper positioning of the power assembly in its attachment to the body. To this end, the power assembly 12 is conformed in peripheral configuration to that of the recess 21. More particularly, the assembly is provided as being of substantially rectangular peripheral cross section with a smoothly curving semi-elliptical front end face conforming to that of crown 41. Intermediate each side of the assembly, there is provided a vertical shoulder 43 (see FIGURE 4) for engaging one of the vertical edges 39 of the recess 21 when the assembly is fully engaged therein. In addition, a pair of transversely spaced longitudinally projecting cylindrical bosses 44 are provided at the rear end face of the power assembly 12. These bosses 44 are arranged to be received by conformed transversely spaced cylindrical positioning indentations 46 in the rear end face of recess 21 when the assembly is properly engaged therein. A pair of bores 47 are provided in communication with the indentations 46 and extend longitudinally therefrom through the head portion 19 of the body 11 to the hand hole 17. A pair of tapped holes 48 are provided centrally of the bosses 44 for registry with the bores 47 when the bosses are properly inserted within the indentations 46 and the assembly 12 is hence properly positioned within the recess 21. A pair of bolts 49 or other threaded fasteners inserted through the bores 47 and threadably engaging the tapped holes 48 is hence all that is required to secure the power assembly 12 to the main body 11. The power assembly 12 is consequently readily detachable from the body 11 by simply removing the bolts 49. As an aid in removing the power assembly, the curved front face thereof is formed with vertical finger grip recesses 51 at the opposite sides thereof.

Figure 5:
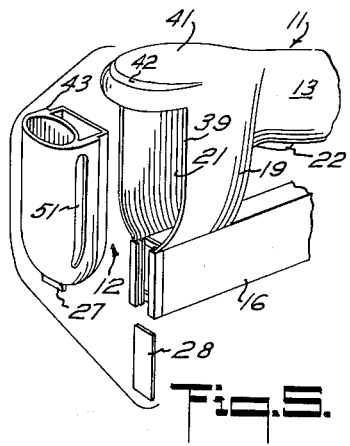
FIGURE 5 is a fragmentary perspective view of the machine with parts thereof disassembled.

As regards the internal structure of the power assembly 12, the cylinder 23 thereof is preferably of oval cross section as hereinbefore mentioned. The cylinder is located in the forward portion of the assembly and is separated by a partitioning wall 52 conformed to the cross section of the cylinder from the reservoir 24 which is located in the rear portion of the assembly. A small passage 53 is provided through the wall 52 to facilitate communication between the reservoir and cylinder. The cylinder and reservoir are both closed at the bottom and open at the top for communication with the bottom region of the valve recess 37 housing quick release valve 20. The piston 26 slideably disposed for reciprocation within the cylinder is hence readily removable through the open top thereof when the power assembly 12 is removed from the body 11, as is readily apparent from FIGURE 5.

A guide slot 54 is provided at the bottom of the cylinder to facilitate traversal by the driving blade 27 secured to the base of the piston. The slot 54 is preferably sufficiently wide to accommodate blades of the largest width. The slot is positioned in the power assembly so as to be flush with the leading edge of the removable fastener receiver 18 disposed within the fastener magazine 16. More particularly, the receiver in the instance of fasteners of the staple variety is provided as a longitudinal bar within the magazine and over which a strip of staples 55 of constant crown width is placed. At the front end of the magazine portion 16 there is attached a gate structure 56 or the like which provides with the blade guard 28 the downwardly opening fastener driveway and driver guide passage 29 of previous mention in registry with the guide slot 54. A staple disposed in the passageway 29 is hence forceably severed from the strip of staples and driven downwardly into material to be fastened by a downward power stroke of the driving blade 27 through the slot 54 and passage 29.

As regards the details of the piston 26 and quick release valve 20 and the manner in which return as well as power strokes of the piston are pneumatically effected, same are only briefly described herein, reference being made to the Goldring et al. patent of previous mention, No. 2,872,901, for a more thorough description of same. Briefly therefore, it will be noted that the quick release valve 20 includes a generally cylindrical valve member 57 within the recessed chamber 37 in the crown 41. The member 57 preferably has an enlarged lower portion 58 of oval cross section to conform to the oval configuration of the cylinder 23. The member further includes a reduced upper portion 59 of cylindrical cross section. The lower end face of portion 58 carries a resilient oval sealing ring 61 which is sealingly engageable against a closure valve seat 62 defining the top of cylinder 23 of the power assembly 12 when engaged in recess 21.

It is to be noted that the recessed chamber 37 is disposed substantially coaxial with cylinder 23 and includes an enlarged oval lower section 63 and smaller cylindrical upper section 64 in conformance with the valve member 57. Reciprocable guiding of the member 57 is thereby effected coaxially of the chamber 37. The lower section 63 of the chamber furthermore has an expanded bottom opening 66 to overlay the reservoir 24 in addition to cylinder 23. By preference, a resilient marginal sealing element 67 is provided around the opening 66 for engagement with the opposing upper wall of the power assembly 12. Thus communication is provided between reservoir 24 and cylinder 23 by means of the expanded opening 66 of the chamber 37 and such communication is controlled by valve member 57.

The peripheral dimensions of the enlarged portion 58 of the valve member 57 are larger than the peripheral dimensions of the cylinder 23. The portion 58 extends beyond the partitioning wall 52 and in part overlies the reservoir 24. The pressure fluid within the reservoir hence normally acts on the margin of the member 57 exposed within the reservoir. Such pressure fluid tends to drive the valve member 57 from the seat 62. However, the pressure fluid is also normally active upon the entire upper face of the enlarged portion 58 of valve member 57. More specifically, the passage 36 which communicates with the main supply reservoir 14 in the handle portion 13 of the body 11 opens into the upper end of the lower section 63 of chamber 37 above the upper face of valve member portion 58. The regions above and below the enlarged portion 58 are sealed from each other as by means of an oval sealing member 68 disposed about the periphery of the enlarged portion. Hence although the pressure fluid is active on both the lower and upper faces of portion 58, the upper face is of greater effective area than at least the overhanging marginal portion of the lower face contiguous the valve seat 62. Moreover, a light biasing coil spring 69 seated abuttingly within a centering recess 71 concentrically about the upper section 64 thrusts against the upper face of the valve member portion 58. The combined effect of the spring and differential in effective areas of the upper and lower faces of portion 58 normally overbalances the valve member 57 toward the cylinder closing position thereof on the valve seat 62.

It is important to note, however, that full unrestricted large volume motivating pressure fluid is impressed upon the exposed underside margin of the valve member 57 in readiness to unseat same and fire the piston 26 when the pressure differential on the valve member portion 58 is reversed. As mentioned previously, depression of trigger 22 effects closure of passage 32 by means of control valve 39 and hence interrupts the flow of fluid through passage 36 to chamber 37. Furthermore, the region of lower section 63 of chamber 37 above the valve body portion 58 is simultaneously vented to atmosphere through the passage 36 and vent opening 38 of the control valve 39. This region is hence depressurized resulting in reversal of the pressure differential on the valve body portion 58. Rapid opening of the valve body in response to depression of trigger 22 is thus effected to produce a rapid driving stroke of piston 26. Thereafter with the trigger returned to normal position, the pressure fluid from reservoir 14 is again applied through passage 36 to the region of chamber 37 above the valve body portion 58. The pressure differential is thus again reversed to a direction which seats the valve member 57 and closes the cylinder 23 from reservoir 24. Air trapped in the upper region of the cylinder at this time is bled to atmosphere through a central passage 70 extending longitudinally through member 57 and communicating at its upper end with vent 42.

Figure 3:
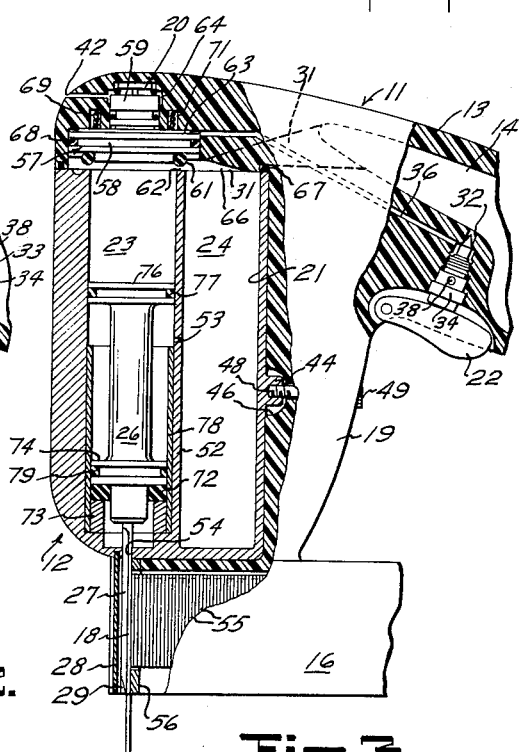
FIGURE 3 is a view similar to FIGURE 2 but with the driving piston and other mechanism of the machine in the positions thereby assumed at the end of a driving stroke.

At the end of a power driving stroke of the piston 26, as depicted in FIGURE 3, wherein the driving blade 27 drives one of the fasteners 55 from the magazine and into work positioned under the machine, the underside of the piston comes to rest against an annular resilient bumper 72 supported upon a stop ring 73 secured within the bottom end of the cylinder 23.

Figure 2:
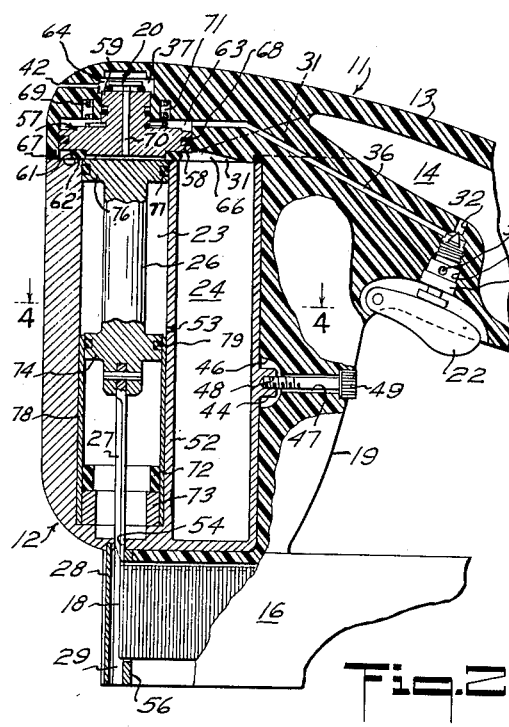
FIGURE 2 is a fragmentary vertical sectional view, partially in elevation, of the machine with the driving piston and other mechanism of the machine in their normal assumed positions prior to a driving stroke.

As regards the means by which the piston in engagement with the resilient bumper 72 at the end of the power stroke is pneumatically returned to its normal position as depicted in FIGURE 2, it will be noted that the piston is of a configuration to include pneumatic return means having a differentially pressurized relationship to the side of the piston exposed to the reservoir 24 upon opening of the cylinder 23. The differential relationship is such that when the cylinder 23 is closed by valve 20, the return means maintains the piston in returned position. Herein the return means comprises an oval projecting collar portion 74 formed at the lower end of the piston and of a lesser cross sectional area than an oval projecting collar portion 76 at the top of the piston. The upper collar portion 76 is arranged for sealed engagement with the walls of cylinder 23 through an oval seal member 77 seated in a peripheral groove in the collar portion. The lower collar portion 74 being of smaller cross section than the collar portion 76, and therefore the cylinder 23, is arranged to engage an oval sleeve 78, secured within the lower end of the cylinder, through an oval seal member 79 seated in a peripheral groove in the lower collar portion. The sleeve 78 extends from substantially the bottom of the cylinder to a position just below the communicating orifice 53 between the cylinder 23 and reservoir 24. Furthermore, the spacing between the upper and lower collar portions 76 and 74 is such that at the end of a driving stroke of the piston, the upper collar portion 76 is still above the orifice 53. Thus the motivating pressure fluid supply of reservoir 24 is at all times in communication with the cylinder 23 in the region between the upper and lower collar portions of the piston. The marginal lower face of the upper collar portion 76 is, however, of lesser effective surface area than the entire upper face thereof. Consequently when the valve 20 is open and the upper as well as the lower face of the collar portion 76 is subjected to the pressure fluid supply of reservoir 24, the pressure differential across the collar portion is directed to urge the piston downwardly in a power stroke. Subsequent to the power stroke when the valve 20 recloses, the supply of pressure fluid is removed from the upper face of collar portion 76. The pressure fluid hence only appears in the cylinder between the collar portions 74 and 76 and is statically impressed at the upper face of the former and lower face of the latter. By virtue of the larger effective area of the upper collar portion, a pressure differential is established in a direction to drive the piston in a return stroke upwardly to the top of the cylinder. The air in the cylinder above the piston collar portion 76 is bled off through passage 70 and vent 42 as noted previously.

In the operation of the pneumatically-operated fastener for driving machine, the head portion 19 of the main body is positioned over work to be fastened, ready maneuverability of the machine being facilitated by the hand grip portion 13. By virtue of the oval configuration of the head portion and power assembly 12 removably secured therein, the machine may be placed for fastening purposes extremely close to the margin of work bounded by a projecting wall. To fire a staple 55 or other fastener from magazine portion 16 into the work, the trigger 22 is digitally depressed. The quick release valve 20 carried in the head cap 41 is responsively popped open under the full pressure fluid supply of reservoir 24 housed within the power assembly 12 and fed from the supply reservoir 14 within handle portion 13. Instantaneously, the full pressure fluid supply of the reservoir 24 is placed in communication with the upper end of cylinder 23 and impressed upon the upper face of piston 26. The piston is thereby rapidly forced downward in a power stroke and the driver blade 27 secured to its lower end forceably drives a staple from the magazine receiver 18 into the work. Upon release of the trigger 22, the valve 20 closes and the pressure differential return means built into the power assembly 12 pneumatically effects a return stroke of the piston 26.

When it is desired to use staples or other fasteners of different size than presently in use, it is only necessary to detach the blade guard 28 and remove the receiver 18 from the fastener magazine portion 16 of the body 11. A receiver of appropriate size to accommodate the desired size fasteners is then inserted in loaded condition within the magazine. Where a change in the size of the driving blade 27 or length of stroke of piston 26 is necessitated to accommodate the different fastener size, the change is readily facilitated by removing the power assembly 12 from the body 11. Unlike conventional fastener driving machines wherein a major disassembly of the machine is required to facilitate a blade or piston change, the power assembly 12 is readily detached from the head portion 19 of the body merely by unfastening the pair of bolts 49. With the assembly removed, the piston 26 is lifted from the cylinder 23 through the open upper end thereof. The blade 27 may then be changed and the piston, or a piston of different length stroke, placed in the cylinder. The power assembly 12 as thus converted to use with the different size fasteners is then placed in the recess 21 of the head and secured by the bolts 49. Proper positioning of the power assembly in the recess 21 to facilitate operable coaction with the various elements of the body member 11 is insured by the shoulders 43 and positioning bosses 44 for locating the assembly in the recess. Thereafter, the blade guard 28 is reattached to the power assembly 12 and the machine is ready for service with the different size fasteners. The same basic unit may hence be utilized with fasteners of substantially all sizes.

What is claimed is:

1. In a pneumatically-operated fastener driving machine having a main body including a handle portion, a fastener magazine portion beneath the handle portion, and a head portion interconnecting the forward ends of the handle and magazine portions, said head portion having a forwardly directed recess and a cap overlying the top of the recess and extending forwardly thereof; the combination therewith of a power assembly removably engaged within the recess beneath the cap, means releasably securing said assembly in said recess, said power assembly including a cylinder, a pressure fluid reservoir transversely adjacent said cylinder, a piston reciprocably disposed within the cylinder, and a driver secured to the piston and protruding downwardly from the assembly and adapted for engagement with fasteners in said magazine; and control valve means disposed within said cap for controlling communication between said reservoir and the top of said cylinder, said valve means normally closing the cylinder but operable to open the cylinder to the full effect of fluid pressure within the reservoir for driving the piston in a fastener driving stroke.

2. A driving machine according to claim 1, further defied by said means releasably securing said assembly in said recess including mutually engageable position determining means on said assembly and said head portion adjacent said recess for locating the assembly in operable position within the recess relative to said control valve means and fastener magazine portion of the body.

3. In a fastener driving machine, including a main body having at the front thereof a power unit receiving portion and at the bottom thereof a fastener magazine portion, said body also having a pressure air reservoir arranged for connection to a pressure source and air passage means in communication with said reservoir; the combination therewith of a power unit operatively positioned on said receiving portion, means for releasably securing said unit in said position; said unit including a cylinder with a driving piston and arranged for communication with said passage means; means in said body overlying said cylinder and arranged for cooperation therewith to selectively place and prevent communication between the cylinder and said passage means.

4. In a fastener driving machine including a main body having at the front thereof a power unit receiving portion and at the bottom thereof a fastener magazine portion, said body also having air passage means for connection with a pressure source; the combination therewith of a power unit operatively positioned on said receiving portion, means for releasably securing said unit in said position; said unit including a cylinder with a driving piston reciprocably mounted therein, and said unit also including a separate air chamber in communication with said air passage means and in part surrounding and arranged for communication with said cylinder; a control valve operatively interposed between said cylinder and chamber and selectively operable to open and close communication between the chamber and cylinder.

5. In a fastener driving machine including a main body having a power unit receiving portion adjacent the front end of the body, a handle portion extending from said receiving portion toward the rear of the body, a head portion extending over said receiving portion, all of said portions being associated to provide a substantially one-piece body, a power unit for driving fasteners releasably positioned in said receiving portion and underlying said head portion, said head portion and unit having cooperating members for operating said unit, and means for securing said unit in said receiving portion with said members in cooperating relation.

6. A machine in accordance with claim 5, in which said body is also provided at the bottom thereof and as a substantially one-piece port with the power unit-receiving portion a fastener magazine having a fastener guide receiving portion, and a fastener guide releasably positioned in said last mentioned portion in operatively associated relation with the power unit.

7. In a fastener driving machine including a main body having a recessed portion adjacent the front thereof, said body also having air passage means for connection with a pressure source; the combination therewith of a power unit operatively seated in said recess and separable from and independent of the body, means for releasably securing said unit in said recess, said unit including a cylinder with a driving piston reciprocably mounted therein; a control valve in said body overlying said cylinder and reciprocable to selectively place and prevent communication between the cylinder and said passage means, said control valve being contained in a recess forming a continuation of said first recess.

8. In a pneumatically operated driving machine having a main body including an air reservoir and provided with a forwardly extending head portion and a forwardly directed recess with at least a portion of the latter underlying said head portion, said head portion having an upwardly extending chamber in communication with said recess and with said reservoir; the combination therewith of a power assembly independent of said body and adapted to seat in said recess, means releasably securing said assembly in said recess, said assembly including a cylinder having an open top in communication with said head chamber and a piston having a driver attached thereto slidably mounted in said cylinder, a valve disposed in said head chamber and normally closing said cylinder from said reservoir, said valve having a peripheral portion extending laterally beyond said cylinder, and means for closing communication between said reservoir and said head chamber and subjecting the lower surface of said peripheral portion of the valve to reservoir pressure for raising said valve to open the cylinder to the pressure in said reservoir for driving the piston downwardly in a power stroke.

References Cited in the file of this patent

UNITED STATES PATENTS

| | | |
|---|---|---|
| Re. 23,756 | Julifs | Dec. 22, 1953 |
| 2,276,435 | Thompson | Mar. 17, 1942 |
| 2,713,165 | Campbell | July 19, 1955 |
| 2,822,544 | Anstett | Feb. 11, 1958 |
| 2,872,901 | Goldring | Feb. 10, 1959 |